United States Patent [19]

Slagel et al.

[11] 4,164,540

[45] Aug. 14, 1979

[54] CARBON BLACK REACTOR

[75] Inventors: John E. Slagel; Jack W. Brock, both of Orange, Tex.

[73] Assignee: Phillips Petroleum Company, Bartlesville, Okla.

[21] Appl. No.: 782,607

[22] Filed: Mar. 29, 1977

[51] Int. Cl.² .................. C09C 1/48; F23D 15/04
[52] U.S. Cl. .................. 422/158; 422/151; 431/353
[58] Field of Search .............. 23/259.5; 431/350, 353; 239/461, 463; 422/150, 151, 152–158

[56] References Cited

U.S. PATENT DOCUMENTS

| | | | |
|---|---|---|---|
| 3,015,543 | 1/1962 | Freg | 23/259.5 |
| 3,235,334 | 2/1966 | Kelmers | 23/259.5 |
| 3,490,869 | 1/1970 | Heller | 23/259.5 X |
| 3,649,207 | 3/1972 | Hinson, Jr. | 23/259.5 |
| 4,065,265 | 12/1977 | Chesnutt | 23/259.5 |

*Primary Examiner*—Michael S. Marcus

[57] ABSTRACT

A carbon black reactor which has a precombustion zone and reaction zone therein with inlet means communicating with the precombustion zone for the introduction of hot combustion gases thereinto. A conduit communicates with the interior of the reactor and has mounted one one end thereof a nozzle for the discharge of make hydrocarbon into either the precombustion zone or reaction zone. A tubular member has an open end and surrounds a free end of the nozzle with the tubular member extending downstream of the free end whereby the open end of the tubular member permits flow of make hydrocarbon from the nozzle through the tubular member and out into the reactor.

6 Claims, 2 Drawing Figures

CARBON BLACK REACTOR

Reactors are well known in the art for the production of carbon black and one of the main considerations in operating such reactors is the amount of carbon black which can be produced per pound of make hydrocarbon since the make hydrocarbon is a major expense in the carbon black producing process. Therefore, logically the more carbon black one can produce per pound of make hydrocarbon the more efficient the operation of the system is in general. A typical carbon black reactor as is disclosed in U.S. Pat. No. 2,546,700 operates effectively for the production of carbon black. It has been found that by a change in the nozzle design more carbon black can be produced per pound of make hydrocarbon introduced while operating the reactor under the same operating conditions. Although it would appear that the increase in carbon black production percentage wise is very small, for a long run this minor percentage increase is very important. A typical carbon black reactor as disclosed in the above-cited patent and having a reaction zone diameter of 15 inches would produce in a year approximately 14,200,000 pounds of carbon black, e.g. N339 type. By use of the present invention, an additional 350,000 pounds of N339 type carbon black can be produced while maintaining the other input materials the same.

The expense of the change necessary to add the invention to a currently existing carbon black reactor is extremely small and requires no modification of currently existing reactors exclusive of the nozzle. Although the change appears to be minor, as discussed above, a long term operation of a carbon black reactor using the present invention pays high dividends in increased profit by virtue of increased carbon black production per pound of make hydrocarbon introduced.

The principal object of the present invention is to provide a carbon black reactor with a nozzle which results, during operation, in an increase of carbon black production per pound of make hydrocarbon with a minimum of change in a carbon black reactor.

Other objects and advantages of the present invention will become apparent from the following detailed description taken in connection with the accompanying drawings wherein are set forth by way of illustration and example certain embodiments of this invention.

Figure 1:
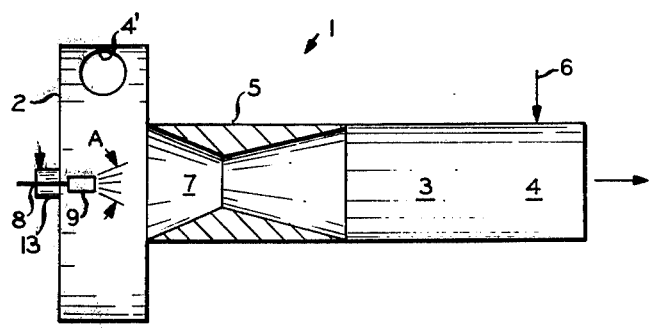
FIG. 1 is a schematic representation of a carbon black reactor embodying the present invention.
Figure 2:
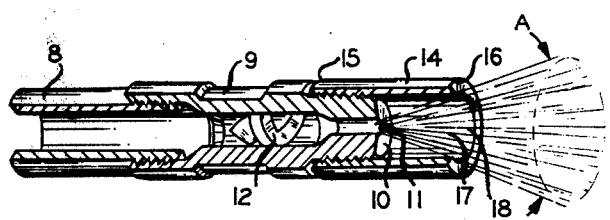
FIG. 2 is an enlarged perspective sectional view of a nozzle portion of the reactor.

Referring more in detail to the drawings:

A carbon black reactor 1 of any suitable type is comprised of a precombustion zone 2 which is in flow communication with a reaction zone 3 which, flow-wise, is positioned downstream of the precombustion zone 2. Downstream of the reaction zone 3 there is provided a quench zone 4. The design and operation of the various zones of a typical carbon black reactor are well known in the art and therefore need not be further described herein. A vortex flow type reactor is illustrated, however, it is to be understood that various other types of carbon black reactors are equally adapted to this invention. A tangentially directed inlet 4' opens into the precombustion zone 2 and is operable for introducing combustion gases into the precombustion zone. The gases can include either a burning or nonburning mixture of air and fuel and the air can be preheated before mixing with the fuel and flow through the inlet 4'. A housing 5 defines the precombustion zone 2, reaction zone 3 and quench zone 4. A quench fluid injection means 6 opens into the quench zone 4 and is operable for the introduction of a coolant fluid such as water into effluent flowing along the reactor to quench same to a temperature sufficiently low to substantially stop the pyrolysis of the make hydrocarbon. This is well known in the art and also need not be further described herein. A venturi 7 can also be provided adjacent the upstream end of the reaction zone 3 as is well known in the art.

A conduit 8 extends into the reactor 1 and is operable for conducting a make hydrocarbon from a suitable source to a nozzle 9. The conduit opens preferably into the precombustion zone 2 or extends thereinto, as illustrated, and has the nozzle 9 secured to a free end thereof by any suitable means such as by threaded engagement. The nozzle 9 has a free end 10 with a discharge orifice 11 opening thereon with the orifice 11 preferably being operable to atomize the discharged make hydrocarbon and control the shape of the stream of make hydrocarbon being discharged therefrom. Preferably, the conduit 8 and nozzle 9 are generally in axial alignment with the longitudinal axis of the reaction zone 3. In the form shown the stream of make hydrocarbon being discharged is cone shaped and preferably is between an angle of between about 5° and 45° total included angle A adjacent the orifice 11. Any suitable type of nozzle can be used and can be a multiple orifice nozzle or a single orifice nozzle. Also, the nozzle 9 can be a swirl type, as shown, and has a baffle 12 which imparts a swirl rotational direction to the make hydrocarbon flowing through the orifice 11. Such nozzles are known in the art as thus far described. Also, a conduit 13 can be provided surrounding the conduit 8 so axial directed air can be introduced to cool the nozzle 9 as is known in the art.

A tubular member 14 is positioned in the reactor 1 adjacent the nozzle 9 and has opposite ends 15 and 16. The end 15 preferably is closed to prevent the flow of fluid between the tubular member 14 and the nozzle 9 from the end 15. This can be accomplished by several methods such as securing the tubular member to the rear wall of the precombustion zone or as shown the tubular member 14 can be mounted directly on the nozzle 9 as by threaded engagement with an exterior surface of the nozzle 9. The end 16 of the nozzle 9 is open and the tubular member has a flow passage 17 which preferably is coaxial with the nozzle 9 and the discharge orifice 11. However, this coaxial alignment of the passage 17 with the discharge orifice 11 could be different if a multiple orifice nozzle were used. The important aspect of the present invention is that the tubular member 14 extend beyond the end 10 of the nozzle whereby the discharge make hydrocarbon flowing through the orifice 11 flows first through the tubular member 14, i.e., the passage 17, before being discharged through the opening 18. The nozzle 9 can be positioned either in the precombustion zone 2 or the reaction zone 3 for operation of the reactor 1. Preferably, the tubular member 14 extends beyond the end 10 a length sufficient to allow the make hydrocarbon to form a uniform stream before the make hydrocarbon comes into contact with the combustion gases in the precombustion zone 2 or the reaction zone 3. Preferably, the length of the tubular member extending beyond the end 10 is approximately 3 times the diameter of the opening 18 and preferably is in a range between 1.5 times and 8 times the diameter of the opening 18. If a tubular member of other than one having a round passage 17, then the minor dimension of the passage would have a size about the same as described for the diameter of a round passage. In such other embodiments, it is preferred that the diameter of the opening 18 and the length of the tubular member 14 projecting beyond the end 10 is such that there is contact of the make hydrocarbon with the interior of the tubular member 14 before same is discharged into the reactor 1.

The tubular member 14 forms a fluid flow barrier preventing flow of fluid, i.e., the combustion gases, which are exterior of the nozzle over the free end of the nozzle form a position upstream of the free end of the nozzle. The tubular member 14 can also be carried by the conduit 8 equally as well as by being carried by the nozzle 9.

In order to illustrate operation of the present invention, the following data is provided. Two runs were made under substantially the same conditions of operating parameters and are listed below. The only difference between the runs was the addition of a tubular member 14 onto the nozzle 9. As can be seen from the data, an increase in carbon black production of 0.11 pounds per gallon of make hydrocarbon was realized. This increase amounts to about 350,000 pounds of carbon black per year.

Table

|  | I | | II | |
|---|---|---|---|---|
|  | With Conventional Nozzle | | With Invention's Collar on Nozzle | |
| I. Operating Conditions: | | | | |
| Tangential Air, (line 4) | 198,210 SCF/H | 5,617 m³/H | 200,439 SCF/H | 5,680 m³/H |
| Axial Air, (line 13) | 5,877 SCF/H | 167 m³/H | 6,120 SCF/H | 173 m³/H |
| Tang. Natural Gas (1000 Btu/ft³), (line 4) | 12,302 (SCF/H | 349 m³/H | 12,223 SCF/H | 439° C. |
| Tang. Air Temp. | 817° F. | 436° C. | 823° F. | 439° C. |
| Air/Natural Gas Vol. Ratio, | 16.1 | 16.1 | 16.4 | 16.4 |
| Axial Make Oil, (line 8) | 361 Gal/H | 1.37 m³/H | 369 Gal/H | 1.40 m³/H |
| BMCI, | 120 | 120 | 120 | 120 |
| Mid-Boiling Point, | 790° F. | 421° C. | 790° F. | 421° C. |
| Oil Pressure, | 89 psig | 614 kPa g. | 192 psig | 1,325 kPa g. |
| Water Prequench, (line 6) | 71 Gal/H | 0.27 m³/H | 70 Gal/H | 0.27 m³/H |
| Locus, | 48 in. | 122 cm. | 48 in. | 122 cm. |
| Final Water Quench (a), | 665 Gal/H | 2.52 m³/H | 623 Gal/H | 2.36 m³/H |
| Locus, | 112 in. | 284.5 cm | 112 in. | 284.5 cm |
| Reactor Pressure, | 3.70 psig | 25.5 kPa g. | 3.63 psig | 25.0 kPa g. |
| PPM K+ (KNO₃) in Oil, | 0 | 0 | 0 | 0 |
| II. Reactor Dimensions: | | | | |
| *Precombustion Zone:* | | | | |
| Diameter, | 39 in. | 99 cm. | 39 in. | 99 cm. |
| Length, | 12 in. | 30.5 cm. | 12 in. | 30.5 cm. |
| *Reaction Zone:* | | | | |
| Diameter, | 15 in. | 38.1 cm. | 15 in. | 38.1 cm. |
| Length, (a), | 82 in. | 208.3 cm. | 82 in. | 208.3 cm |
| *Venturi:* | | | | |
| Lengths: | | | | |
| Converging Zone, | 13 in. | 33.0 cm. | 13 in. | 33.0 cm. |
| Diverging Zone, | 15 in. | 38.1 cm. | 15 in. | 38.1 cm. |
| Throat, | 2 in. | 5.1 cm. | 2 in. | 5.1 cm. |
| Diameters: | | | | |
| Inlet, | 15 in. | 38.1 cm. | 15 in. | 38.1 cm. |
| Throat, | 8 in. | 20.3 cm. | 8 in. | 20.3 cm. |
| Outlet, | 12 in. | 30.5 cm. | 12 in. | 30.5 cm. |
| III. Carbon Black Product: | | | | |
| N 339 Yield, | 4.47 lbs/gal. | (0.54 kg/liter) | 4.58 lbs/gal. | (0.55 kg/liter) |
| (1) I₂No, mg/gm. | 94 | 94 | 99 | 99 |
| (2) DBP, cc/100 gm, | 150 | 150 | 157 | 157 |
| (3) CTAB, m²/gm, | 96 | 96 | 100 | 100 |
| (4) Tinting Strength, | 109 | 109 | 110 | 110 |
| (5) Photelometer, | 79 | 79 | 86 | 86 |

Text Procedures
(1) ASTM D 1510-76;
(2) ASTM D 2414-70;
(3) J. Jansen and G. Kraus, Rubber Chemistry and Technology, 44, 1287 (1971);
(4) ASTM D 3265-75;
(5) ASTM D 1618-58T.
(a) The final quench locus was 112 inches (284.5 cm.) downstream from the downstream end of the precombustion zone. This locus is the reactor length, as defined herein.

The data above show different axial make oil pressures were used. This was done so that substantially the same flow rates of make oil through same sized orifices could be effected in both runs. Pressure was changed so that an equal flow rate could be achieved so that true comparative runs could be made. The reason for this different pressure requirement is not fully known but could possibly be due to the use of the tubular member.

The conventional nozzle used in Run I was a Spraying Systems Company Nozzle Type 1550; the orifice was drilled to 0.165 inches diameter. This produces a solid spray cone having a total 15 degrees spray angle.

The nozzle of the invention in Run II was a Spraying Systems Company GD-15 nozzle drilled to 0.165 inch diameter orifice, 30 degree total solid cone spray angle. That is, the total spring angle was 30° with no collar attached thereto. Attached thereto at the outlet end of the nozzle was a ⅜ inch inside diameter collar. The length of the collar from the nozzle tip to the downstream end of the collar was one inch. The estimated final spray angle of the oil leaving the outlet of the collar was about 15° with the 1 inch long by ⅜ inch inside diameter collar.

It is to be understood that while there has been illustrated and described certain forms of this invention, it is not to be limited to the specific form or arrangement of parts herein described and shown except to the extent that such limitations are found in the claims.

What is claimed and desired to be secured by Letters Patent is:

1. A carbon black reactor having an improved make oil dispensing nozzle wherein said carbon black reactor includes:
   (a) a housing defining a precombustion zone and reaction zone therein, said reaction zone being in downstream flow communication with the precombustion zone;
   (b) inlet means communicating with said precombustion zone operable for introducing combustion gases thereinto;
   (c) a conduit extending into said precombustion zone;
   (d) a nozzle mounted on said conduit for receiving make oil therefrom and positioned in one of said reaction zone and said precombustion zone, said nozzle having a discharge orifice opening on a free end thereof operable for discharge of a generally cone-shaped stream of make oil; and
   (e) a tubular member positioned in one of said precombustion zone and said reaction zone, said nozzle being positioned within said tubular member, said tubular member having an open end directed generally in a downstream direction with respect to the direction of discharge of make oil from said nozzle and extending in said downstream direction beyond the free end of the nozzle, the other end of said tubular member being closed about one of said conduit and said nozzle to prevent the flow of combustion gases between said tubular member and said nozzle from said other end, said tubular member having a size such that at least a portion of the coneshaped stream of make oil will contact an interior surface of said tubular member.

2. A reactor as set forth in claim 1 wherein:
said tubular member forms a fluid flow barrier preventing combustion gases on the exterior of the nozzle from flowing over the free end of the nozzle.

3. A reactor as set forth in claim 1 wherein:
said tubular member is carried by one of said conduit and said nozzle.

4. A reactor as set forth in claim 3 wherein:
said nozzle is a swirl flow nozzle.

5. A reactor as set forth in claim 3 wherein:
said tubular member extends beyond said free end of said nozzle about 1.5 to about 8 times the minor inside transverse dimension of said tubular member.

6. A reactor as set forth in claim 5 wherein:
said tubular member is generally round in transverse cross section.

* * * * *